June 29, 1971    F. J. SCHLESINGER    3,588,942

CONNECTOR FOR WINDSHIELD WIPER ARM AND BLADE

Filed Nov. 19, 1969

INVENTOR
FRANK J. SCHLESINGER
BY
ATTORNEY

United States Patent Office 3,588,942
Patented June 29, 1971

3,588,942
CONNECTOR FOR WINDSHIELD WIPER ARM
AND BLADE
Frank J. Schlesinger, Merrillville, Ind., assignor to
The Anderson Company
Filed Nov. 19, 1969, Ser. No. 878,148
Int. Cl. A47l 1/00; B60s 1/40
U.S. Cl. 15—250.32                    2 Claims

ABSTRACT OF THE DISCLOSURE

A connector adapted to connect a windshield wiper blade and an arm, the blade having aligned apertures in the sides of the uppermost portion of the arm pressure distributing assembly, which uppermost portion is adapted to receive a pin which is releasably maintained against transverse displacement, and the arm having a straight outermost end portion having an abutment thereon. The connector has, at its outer end, a fixedly secured pin which extends transversely outwardly so that it can enter the uppermost portion of the arm pressure distributing assembly of the blade and be engaged releasably therein. The straight end of the arm can be inserted in the inner end of the connector and is releasably held therein.

BACKGROUND OF THE INVENTION

Field of the invention

This invention relates to an improvement in connecting windshield wiper blades and arms and, more particularly, to an improved connector for connecting a windshield wiper blade and arm, the blade being adapted to releasably receive a transversely extending pin and the arm having a straight end with an abutment thereon.

Brief description of the prior art

In recent years there has been an increasing use of windshield wiper blades in which the wiper arm is connected to the blade in side-by-side relationship. The side-by-side relationship of the arm and blade reduces the total height of the arm-blade assembly (i.e., results in a "low silhouette") that permits the arm-blade assembly to enter and park in the narrow aperture formed by a raised cowl at the rear of an automobile hood. Such arm-blade assemblies, typically shown in U.S. Pat. 3,378,874, issued Apr. 23, 1968, are referred to in the trade as "hidden" windshield wipers.

The wiper blade of such arm-blade assemblies typically has an arm pressure distributing assembly whose uppermost portion has aligned apertures in the sides thereof. The aligned apertures are adapted to receive a pin which extends through the apertures and which is releasably maintained against transverse displacement with respect to the apertures. Such blades (called "pin-type" blades) are now used with arms having pins fixedly secured to the ends thereof (called "pin-type" arms). However, there are many cars on the road today that do not have pin-type arms but instead have arms of the type that have an outer straight end portion of rectangular cross-section, the end portion having an abutment thereon which is adapted to be locked in a connecting device. Such arms are frequently referred to as "straight-end" arms. However, there is presently no way by which a straight-end arm can be connected to a pin-type blade.

SUMMARY OF THE INVENTION

The invention is directed to a device for connecting pin-type blades and straight-end arms of the types described above (hereinafter referred to as a connector). The connector comprises an integral member whose outer end portion is shaped so that a portion of a pin may be fixedly secured thereto with another portion of the pin extending transversely outward. The portion of the pin that extends transversely outwardly is shaped so as to enter the aligned apertures of a pin-type blade and to be releasably maintained by the blade against transverse displacement. The inner end portion of the integral member is shaped to receive the end of a straight end wiper arm. The inner end portion of the connector includes resilient means adapted to cooperate with the inner end portion of the integral member to maintain the abutment releasably in locked position within the inner end portion of the integral member.

DESCRIPTION OF THE PREFERRED
EMBODIMENT

Figure 1:
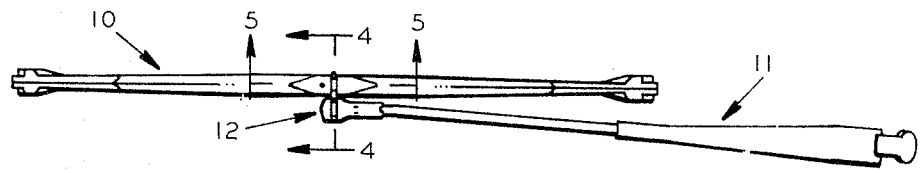
FIG. 1 is a top view of a windshield wiper assembly which includes a wiper blade, a wiper arm and a connector embodying the present invention, the connector joining the blade and the arm in side-by-side relation.

In FIG. 1 there is shown a windshield wiper assembly, referred to commercially as a wiper blade, indicated generally at 10, a windshield wiper arm indicated generally at 11 and a connector indicated generally at 12. As is understood by the art, such blades may be of various types but in general comprise an arm pressure distributing assembly or superstructure connected to a resilient blade element or member. Similarly, the arm may be of various types but generally is adapted to be attached to an oscillating pivot shaft and to resiliently urge the wiper blade towards the windshield. Blade 10 is a pin-type blade whose arm pressure distributing assembly has an uppermost portion, described more fully below, which is adapted to receive a pin which is releasably maintained against transverse displacement, and the arm 11 has a straight outermost end portion having an abutment thereon.

Connector 12 comprises a formed integral member or elongate housing 13 having an outer portion 13a and an inner portion 13b. The outer portion 13a of member 13 is channel-shaped with a top wall 15 and depending side walls 16. A generally cylindrical pin 18 has an inner portion 18a which is fixedly secured within the outer portion 13a of the connector, such as by inserting the inner portion 18a of the pin in apertures in side walls 16 and, thereafter, stamping or compressing the top wall 15 so as to hold the pin immovably in the connector.

The outer portion of pin 18 extends transversely outward (i.e., it extends in a direction perpendicular to the longitudinal axis of the connector and that of the blade) and has a conical shaped head or end 20 and a median cylindrically shaped section or part of reduced diameter 21 (i.e., part 21 has a substantially smaller diameter than the adjacent cylindrical sections 22 and 23). The uppermost portion of the pressure distributing assembly, indicated generally at 24, has a top wall 25 and depending side walls 26 and has side openings for the insertion of the outer portion of pin 18. Accordingly, cylindrical sections 22 and 23 of the pin have diameters slightly less than those of the side openings in the uppermost portion 24 of blade 10. During the insertion of the pin in portion 24, the pin displaces leaf spring 27 which thereafter springs back and engages the median portion 21 of the pin so as to hold the pin against transverse displacement. Leaf spring 27 is fixedly held to top wall 25 at one end by rivet 28 but is depressable by button 30. The pin may be removed from portion 24 by depressing button 30 and, hence, spring 27 far enough to permit withdrawal of the pin. In operation, the cylindrical sections 22 and 23 can rotate in the side openings of portion 24 so that blade 10 can pivot about the axis of pin 18.

Figure 3:
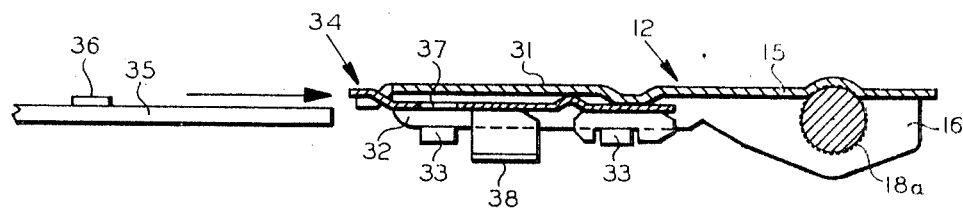
FIG. 3 is a cross-sectional view of the connector of FIG. 2 after assembly, taken along the lines 3—3 and showing the end of the arm in position to enter the connector.
Figure 5:
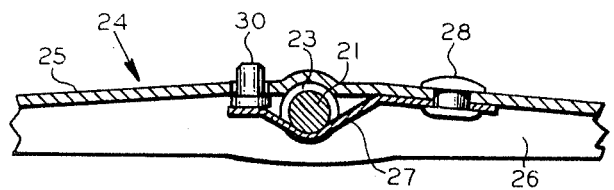
FIG. 5 is a fragmentary enlarged cross-sectional view taken along the lines 5—5 of FIG. 1, illustrating the releasable pin connection.
Figure 4:
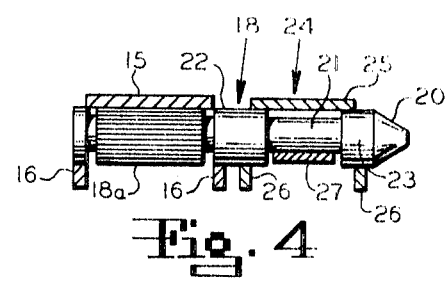
FIG. 4 is a fragmentary enlarged cross-sectional view showing the connection of the outer end of the connector with the blade, taken along the lines 4—4 of FIG. 1.
Figure 2:
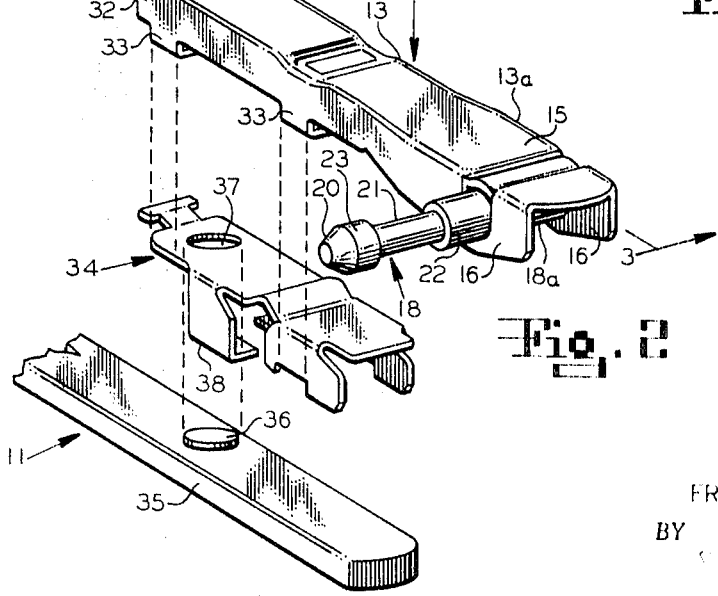
FIG 2 is an enlarged exploded view of a connector embodying the present invention, together with the outermost end of the arm.

The inner portion 13b of member 13 has a channel-shape with a top wall 31, depending side walls 32 and bottom portions or supports 33. Housed within the channel-shaped inner portion is a resilient or spring-like member 34 which, as can be seen from FIGS. 2 and 3, is shaped and disposed so that it interlocks with the inner portion 13b of member 13 so as to be retained therein. The end or terminal portion 35 of arm 11 is of generally rectangular cross-section and has a projection or abutment 36 thereon. When the end 35 of the arm is inserted in the inner portion of the connector, abutment 36 engages aperture 37 of spring member 34 so that it is locked in the connector. Spring member 34 has a portion 38 that projects downwardly and is accessible to manual manipulation. When portion 38 is pressed upwardly, aperture 37 is disengaged from abutment 36 and the end 35 of the arm 11 can be withdrawn from the connector.

It will, of course, be understood that various details of construction may be varied without departing from the principles of this invention, and it is, therefore, not the purpose to limit the patent granted herein otherwise than necessitated by the scope of the appended claims.

What is claimed is:

1. A connector adapted to connect a windshield wiper blade of the type in which the uppermost portion of the arm pressure distributing assembly has a top and depending sides and aligned apertures in the sides, said blade being adapted to receive a pin extending on both sides of said apertures and having means to releasably maintain said pin against transverse displacement and a wiper arm having a straight outermost end portion having a rectangular cross-section, said end portion having an abutment thereon, said connector comprising a formed integral member having a channel-shaped outer end portion having a top wall and depending side walls, the inner portion of said member comprising a housing having connected top, bottom and side portions and being adapted to receive the outermost end portion of the arm, resilient means within said housing adapted to cooperate with said housing to maintain the abutment on the end portion of the arm in locked position in said housing, said resilient means including means adapted to be manually manipulated to release said abutment from its locked position and permit withdrawal of the end of the arm from said housing and a pin having a portion fixedly secured to the top and depending side walls of the outer portion of said member and a portion extending transversely outwardly farther than the distance between the aligned apertures in the side walls of the depending sides of the bridge portion of the wiper blade, the diameter of the outwardly extending portion of said pin being slightly less than the diameter of said aligned apertures, said pin being shaped to cooperate with the means on the blade for releasably maintaining the pin against transverse displacement.

2. The connector of claim 1 in which the median part of the portion of the pin which extends transversely outwardly is cylindrically shaped and of reduced diameter.

References Cited
UNITED STATES PATENTS

| | | | |
|---|---|---|---|
| 3,147,506 | 9/1964 | Williams | 15—250.32 |
| 3,163,877 | 1/1965 | Wubbe | 15—250.32 |
| 3,378,874 | 4/1968 | Scinta | 15—250.32 |

PETER FELDMAN, Primary Examiner